United States Patent
Seo et al.

(10) Patent No.: US 8,649,316 B2
(45) Date of Patent: Feb. 11, 2014

(54) METHOD FOR TRANSMITTING ACKNOWLEDGEMENT/NON-ACKNOWLEDGEMENT IN WIRELESS COMMUNICATION SYSTEM EMPLOYING RELAY STATION

(75) Inventors: Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 259 days.

(21) Appl. No.: 13/127,204

(22) PCT Filed: Oct. 13, 2009

(86) PCT No.: PCT/KR2009/005864
§ 371 (c)(1),
(2), (4) Date: May 2, 2011

(87) PCT Pub. No.: WO2010/062035
PCT Pub. Date: Jun. 3, 2010

(65) Prior Publication Data
US 2011/0211523 A1   Sep. 1, 2011

Related U.S. Application Data

(60) Provisional application No. 61/110,923, filed on Nov. 3, 2008.

(30) Foreign Application Priority Data

Dec. 15, 2008   (KR) .................. 10-2008-0126921

(51) Int. Cl.
 H04B 7/14   (2006.01)
 H04Q 7/20   (2006.01)
 H04H 20/71  (2008.01)

(52) U.S. Cl.
 USPC .......................................... 370/315

(58) Field of Classification Search
 None
 See application file for complete search history.

(56) References Cited

U.S. PATENT DOCUMENTS

| | | | |
|---|---|---|---|
| 2004/0110499 A1* | 6/2004 | Kang et al. ................. | 455/422.1 |
| 2006/0282739 A1* | 12/2006 | Meyer et al. .................. | 714/748 |
| 2008/0049718 A1* | 2/2008 | Chindapol et al. ............ | 370/351 |
| 2008/0070582 A1* | 3/2008 | Cai ................................ | 455/450 |
| 2008/0240014 A1* | 10/2008 | Chang et al. .................. | 370/315 |
| 2008/0248793 A1 | 10/2008 | Chang et al. | |
| 2009/0257371 A1* | 10/2009 | Nishio .......................... | 370/312 |

\* cited by examiner

*Primary Examiner* — Andrew Chriss
*Assistant Examiner* — Ajit Reddy
(74) *Attorney, Agent, or Firm* — Birch, Stewart, Kolasch & Birch, LLP

(57) ABSTRACT

A method for transmitting acknowledgement (ACK)/non-acknowledgement (NACK) in a wireless communication system employing a relay station is provided. The method includes receiving data, and transmitting an ACK/NACK for the data according to a specific rule when the ACK/NACK cannot be transmitted in the synchronous ACK/NACK transmission rule. It is possible to solve a problem caused by ACK/NACK transmission between a base station and a relay station.

2 Claims, 10 Drawing Sheets

METHOD FOR TRANSMITTING ACKNOWLEDGEMENT/NON-ACKNOWLEDGEMENT IN WIRELESS COMMUNICATION SYSTEM EMPLOYING RELAY STATION

CROSS REFERENCE TO RELATED APPLICATIONS

This application is the National Phase of PCT/KR2009/005864 filed on Oct. 13, 2009, which claims priority under 35 U.S.C. 119(e) to U.S. Provisional Application No. 61/110,923 filed on Nov. 3, 2008 and under 35 U.S.C. 119(a) to Patent Application No. 10-2008-0126921 filed in the Republic of Korea on Dec. 15, 2008, all of which are hereby expressly incorporated by reference into the present application.

TECHNICAL FIELD

The present invention relates to wireless communications, and more particularly, to a method for transmitting acknowledgement (ACK)/non-acknowledgment (NACK) in a wireless communication system employing a relay station.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a mobile station, and the like are defined as requirements.

An orthogonal frequency division multiplexing (OFDM) system capable of reducing inter-symbol interference with a low complexity is taken into consideration as one of post-third generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

Meanwhile, in the wireless communication system, a base station (BS) or a mobile station (MS) transmits data, and the MS or the BS transmits acknowledgement (ACK)/non-acknowledgement (NACK) for the data upon receiving the data. When the ACK/NACK is transmitted after a specific time elapses from transmission of data, this is called synchronous ACK/NACK.

If the wireless communication system employs a relay station (RS), data and ACK/NACK can be transmitted via the RS. In this case, a problem arises in that the method for transmitting data and ACK/NACK in the conventional wireless communication system employing only the BS and the MS cannot be directly used in the wireless communication system employing the RS. Accordingly, there is a need for a method for transmitting data and ACK/NACK in the wireless communication system employing the RS.

DISCLOSURE OF INVENTION

Technical Problem

The present invention provides a method for transmitting acknowledgement (ACK)/non-acknowledgment (NACK) in a wireless communication system employing a relay station.

The present invention also provides a method for transmitting data in a wireless communication system employing a relay station.

Solution to Problem

According to an aspect of the present invention, a method for transmitting acknowledgement (ACK)/non-acknowledgement (NACK) in a wireless communication system employing a relay station is provided. The method includes receiving data, and transmitting an ACK/NACK for the data according to a specific rule when the ACK/NACK cannot be transmitted in the synchronous ACK/NACK transmission rule. The specific rule is different from a synchronous ACK/NACK transmission rule.

According to another aspect of the present invention, a method for transmitting data in a wireless communication system employing a relay station is provided. The method includes transmitting first data in a first subframe, and transmitting second data in a second subframe, wherein the second subframe is a subframe delayed by a specific time from the first subframe, and the first data is data not requiring ACK/NACK for transmission of the first data.

Advantageous Effects of Invention

It is possible to solve a problem caused by ACK/NACK transmission between a base station and a relay station.

MODE FOR THE INVENTION

Hereinafter, exemplary embodiments of the present invention will be described in detail with reference to the accompanying drawings.

Figure 1:
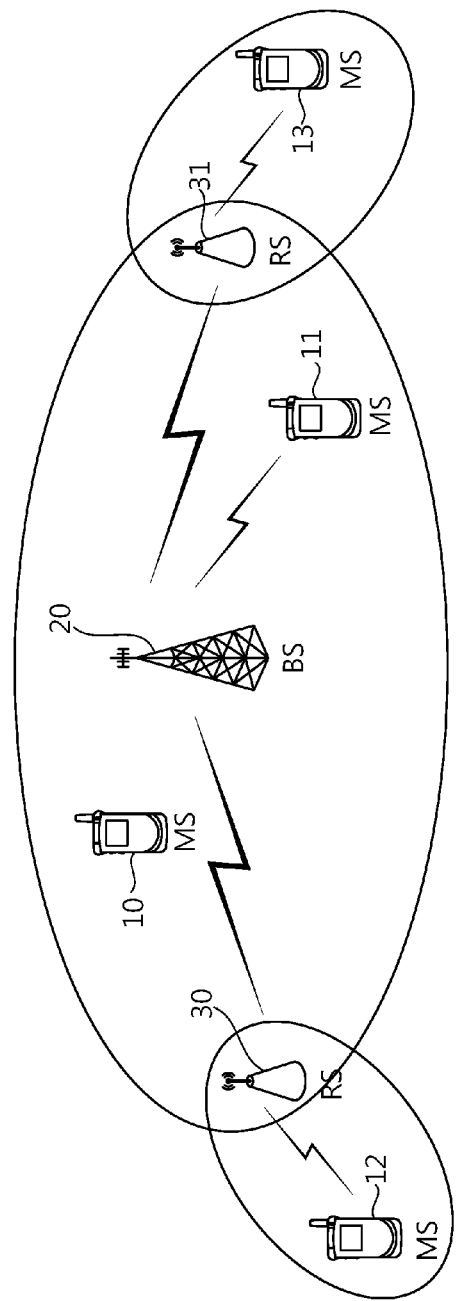
FIG. 1 is a diagram showing a wireless communication system employing a relay station.

FIG. 1 is a diagram showing a wireless communication system employing a relay station. The wireless communication system can be widely deployed to provide a variety of communication services, such as voices, packet data, etc.

Referring to FIG. 1, the wireless communication system includes mobile stations (MSs) 10, 11, 12, and 13, a base station (BS) 20, and relay stations (RSs) 30 and 31. Each of the MSs 10, 11, 12, and 13 may be fixed or mobile, and may be referred to as another terminology, such as a user equipment (UE), a user terminal (UT), a subscriber station (SS), a wireless device, etc. The BS 20 is generally a fixed station that communicates with the MSs 10, 11, 12, and 13 and may be referred to as another terminology, such as a node-B (NB), a base transceiver system (BTS), an access point, etc. One or more cells may exist in the coverage of one BS 20. The RSs 30 and 31 are provided for coverage extension or data transfer rate improvement resulted from a diversity effect, and are located between the MS and the BS. That is, the MSs 10 and 11 located inside the coverage of the BS 20 can directly communicate with the BS 20, and the MSs 12 and 13 located outside the coverage of the BS 20 communicate with the BS 20 via the RSs 30 and 31. Alternatively, for the data transfer rate improvement resulted from the diversity effect, even the MSs 10 and 11 located inside the coverage of the BS 20 may communicate with the BS 20 via the RSs 30 and 31.

Hereinafter, a downlink (DL) denotes a communication link from the BS 20 to the MS 10, and an uplink (UL) denotes a communication link from the MS 10 to the BS 20. In the downlink, a source station is the BS 20, and a destination station is the MS 10. In the uplink, the source station is the MS 10, and the destination station is the BS 20. In the downlink, a transmitter may be a part of the BS 20, and a receiver may be a part of the MS 10. In the uplink, the transmitter may be a part of the MS 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

Meanwhile, in the wireless communication system, a BS or an MS transmits data, and the MS or the BS transmits acknowledgement (ACK)/non-acknowledgement (NACK) for the data upon receiving the data. When the ACK/NACK is transmitted after a predefined time elapses from transmission of data, this is called synchronous ACK/NACK. And the rule of transmitting the synchronous ACK/NACK is called synchronous ACK/NACK transmission rule.

Figure 2:
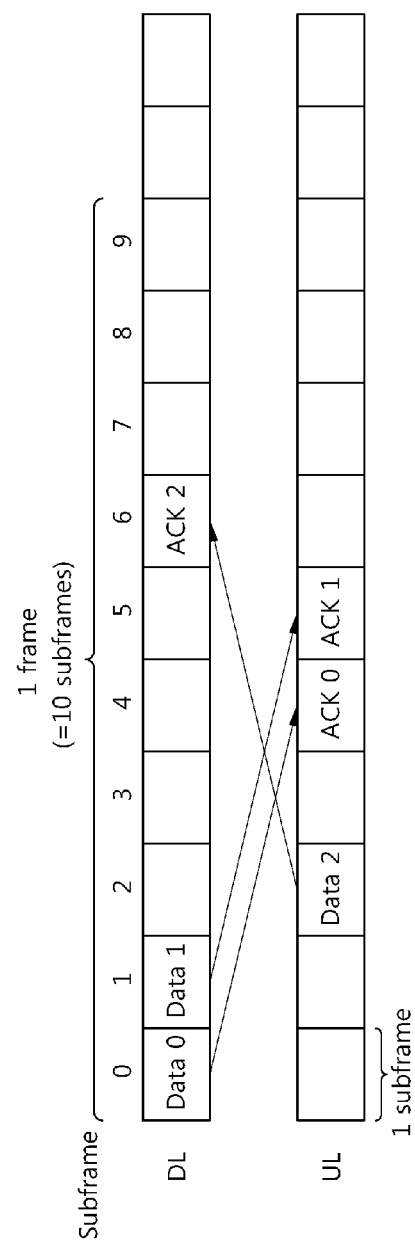
FIG. 2 shows an example of synchronous acknowledgement (ACK)/non-acknowledgement (NACK) transmission.

FIG. 2 shows an example of synchronous ACK/NACK transmission. In this example, data is transmitted according to frequency division duplexing (FDD) in a third generation partnership project (3GPP) evolved universal terrestrial radio access (E-UTRA) system. Even if the example of synchronous ACK/NACK transmission in FIG. 2 is only described in terms of FDD system, the concept can also be applied to time division duplex (TDD) system where uplink and downlink transmissions occur in the same frequency band, but at different time.

Referring to FIG. 2, one frame includes 10 subframes, and downlink transmission and uplink transmission are achieved through different frequency bands. In this case, synchronous ACK/NACK can be transmitted after a time corresponding to m subframes from transmission of data. That is, ACK/NACK for UL or DL data transmitted in a subframe n can be transmitted in the uplink or downlink in a subframe n+m. For example, if m=4, upon receiving data 0 transmitted in the downlink in a subframe 0, an MS can transmit ACK/NACK 0 in the uplink in a subframe 4. Upon receiving data 1 transmitted in the downlink in a subframe 1, the MS can transmit ACK/NACK 1 in the uplink in a subframe 5. Further, upon receiving data 2 in the uplink in a subframe 2, a BS can transmit ACK/NACK 2 in the downlink in a subframe 6.

However, since the synchronous ACK/NACK transmission rule of FIG. 2 applies to a conventional wireless communication system employing only a BS and an MS, it is difficult to apply the synchronous ACK/NACK transmission rule directly to a wireless communication system employing an RS. In particular, if the RS simultaneously transmits and receives a signal through a specific frequency band in a specific subframe, a self-interference problem may occur in which a transmit (Tx) signal causes strong interfere to a receive (Rx) signal. To solve the self-interference problem, a process such as echo-cancellation can be used, which may result in a significantly complex problem. Accordingly, in general, the RS cannot simultaneously transmit and receive a signal through a specific frequency band. For example, if the RS transmits a DL signal to MSs associated with the RS through a DL frequency band in a specific subframe, the RS cannot receive a DL signal transmitted from the BS through the DL frequency band. Likewise, if the RS transmits a UL signal to the BS through a UL frequency band in a specific subframe, the RS cannot receive a UL signal transmitted through the UL frequency band from the MSs associated with the RS.

To solve this problem, two methods have been proposed, and hereinafter, one method is referred to as a blank subframe method, and the other method is referred to as a band swapping method.

Figure 3:
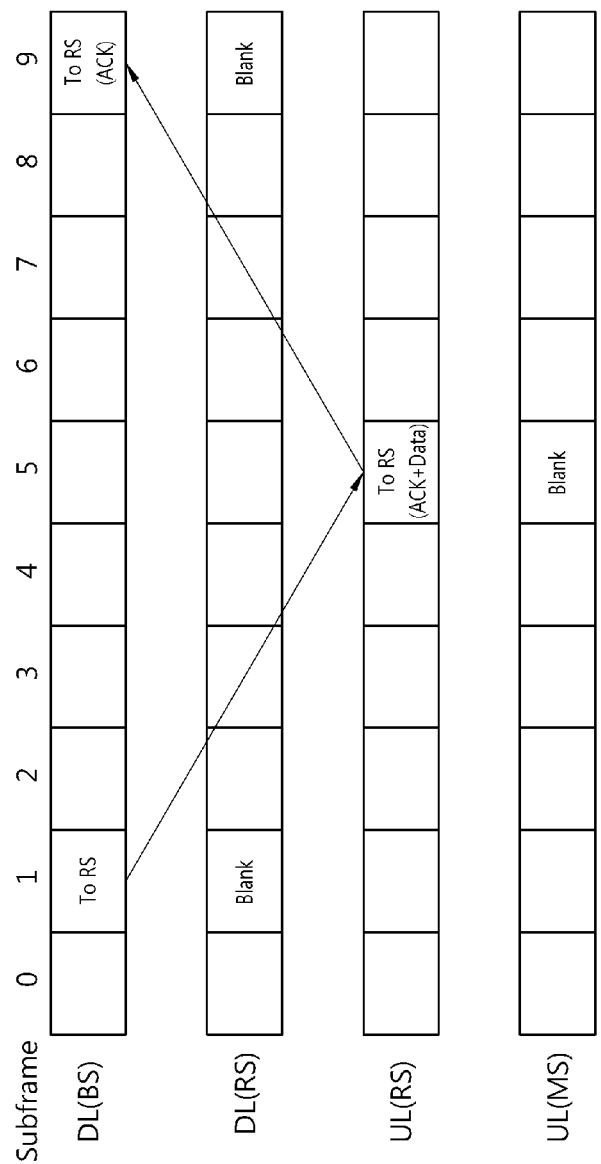
FIG. 3 shows an example of transmitting data and ACK/NACK by using a blank subframe method.

FIG. 3 shows an example of transmitting data and ACK/NACK by using the blank subframe method.

Referring to FIG. 3, one frame includes 10 subframes. Downlink transmission is achieved through a DL frequency band, and uplink transmission is achieved through a UL frequency band. It is assumed herein that synchronous ACK/NACK is transmitted after a time corresponding to 4 subframes from transmission of data.

When a DL signal is received from a BS through the DL frequency band in a specific subframe, an RS sets the specific subframe of the DL frequency band to a blank subframe. Accordingly, the RS cannot transmit the DL signal to MSs associated with the RS through the DL frequency band in the specific subframe. Further, when the RS transmits a UL signal to the BS through the UL frequency band in a specific subframe, the specific subframe of the UL frequency band is set to a blank subframe of the specific subframe. Accordingly, the RS cannot transmit the UL signal to the MSs associated with the RS through the UL frequency band in the specific subframe.

For example, when the BS transmits DL data to the RS through the DL frequency band in a subframe 1, the RS sets the subframe 1 of the DL frequency band to a blank subframe, and does not transmit any DL data to the MSs through the subframe 1 of the DL frequency band. Alternatively, a partial blank subframe can also be used in which a control signal is transmitted in a certain region of one subframe and only signal reception is allowed while not transmitting any signal in the remaining regions of the subframe. The partial blank subframe may use a subframe structure for a multicast service (e.g., MBMS single frequency network (MBSFN) subframe). Meanwhile, if the RS transmits ACK/NACK for data received in the subframe 1 to the BS through the UL frequency band in a subframe 5, the RS sets the subframe 5 of the UL frequency band to a blank subframe, and the MSs do not transmit any UL data through the subframe 5 of the UL frequency band. In addition, if the RS transmits data received from the MSs together with ACK/NACK to the BS through the UL frequency band in the subframe 5, the BS transmits ACK/NACK for the data to the RS through the DL frequency band in a subframe 9. In this case, the RS sets the subframe 9 of the DL frequency band to a blank subframe, and does not transmit any DL data to the MSs through the subframe 9 of the DL frequency band.

Figure 4:
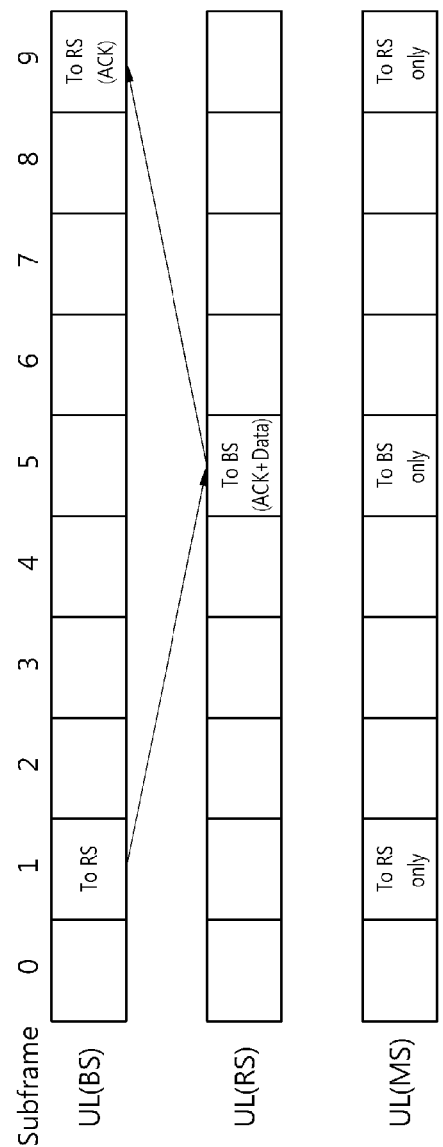
FIG. 4 shows an example of transmitting data and ACK/NACK by using a band swapping method.

FIG. 4 shows an example of transmitting data and ACK/NACK by using the band swapping method.

Referring to FIG. 4, one frame includes 10 subframes. It is assumed herein that synchronous ACK/NACK is transmitted after a time corresponding to 4 subframes from transmission of data.

A BS transmits a signal to an RS through a UL frequency band in a specific subframe. For example, the BS transmits data to the RS through the UL frequency band in a subframe 1. In this case, the RS may receive data transmitted by the BS to the RS and may receive data from MSs by using orthogonal radio resources. The RS transmits data, which is received from the MSs in the subframe 1 together with ACK/NACK for the data received from the BS in the subframe 1, to the BS through the UL frequency band in a subframe 5. In this case, since the RS transmits a signal to the BS, the RS cannot receive signals transmitted from the MSs. Therefore, the MSs cannot transmit signals to the RS in the subframe 5, and can transmit the signals only to the BS. The BS transmits ACK/NACK for the data received in the subframe 5 to the RS through the UL frequency band in a subframe 9.

According to the blank subframe method described in FIG. 3 and the band swapping method described in FIG. 4, the RS can exchange data and ACK/NACK with the BS and the MSs without causing any self-interference problems.

In case of using the blank subframe method, any signal including a reference signal is not transmitted in a blank subframe, and the number of reference signals to be transmitted decreases in a partial blank subframe. Therefore, a data transfer rate decreases, and synchronization of the MSs and channel estimation performance deteriorate. In particular, a 3GPP E-UTRA system in which a synchronization signal is transmitted for synchronization of the MSs in subframes 0 and 5 in each frame has a problem in that initial access of the MSs is difficult when a corresponding subframe is a blank subframe. In general, if there is a control signal that must be transmitted in a specific subframe, a problem arises when the specific subframe is set to a blank subframe or a partial blank subframe.

In case of using the band swapping method, if the BS and the RS transmit a signal through the UL frequency band in a specific subframe, there is a problem in that ACK/NACK cannot be received from the MSs. Referring to the example of FIG. 4, the BS transmits a signal to the RS through the UL frequency band in the subframe 9, and thus cannot receive ACK/NACK transmitted by the MSs to the BS through the UL frequency band in the subframe 9. This implies that synchronous ACK/NACK for data transmitted to the MSs through the DL frequency band in the subframe 5 cannot be received. Likewise, if the RS transmits data to the BS through the UL frequency band in the subframe 5, the RS cannot receive synchronous ACK/NACK for data transmitted to the MSs through the DL frequency band in the subframe 1.

Accordingly, there is a need for a suitable method for transmitting data and ACK/NACK by complementing the blank subframe method or the band swapping method in the wireless communication system employing the RS.

Hereinafter, the method for transmitting ACK/NACK according to the present invention is applied not only to FDD system but also TDD system. Therefore, DL frequency band (or UL frequency band) in FDD system can be regarded as DL subframe (or UL subframe) in TDD system. This is only for exemplary purpose, so DL frequency band (or UL frequency band) in FDD system may be mapped to any terms representing DL transmission (or UL transmission) in TDD system.

Figure 5:
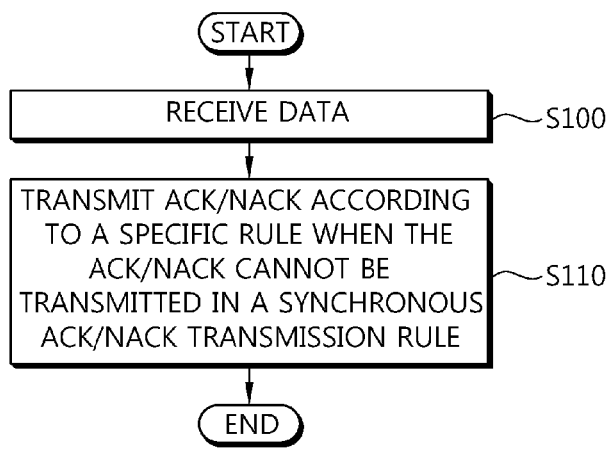
FIG. 5 is a flowchart showing a method for transmitting ACK/NACK according to an embodiment of the present invention.

FIG. 5 is a flowchart showing a method for transmitting ACK/NACK according to an embodiment of the present invention.

Referring to FIG. 5, an RS receives data (step S100). The RS may receive the data from a BS or an MS. According to the blank subframe method, the RS can receive data from the BS through a DL frequency band, or can receive data from the MS through a UL frequency band. According to the band swapping method, the RS can receive data from the BS or the MS through the UL frequency band.

The RS transmits ACK/NACK for the data received in step S100 (step S110). Preferentially, the RS uses a synchronous ACK/NACK transmission rule in which ACK/NACK is transmitted after a specific time elapses from reception of data. However, if the ACK/NACK cannot be transmitted according to the synchronous ACK/NACK transmission rule, the ACK/NACK is transmitted according to a specific rule other than the synchronous ACK/NACK transmission rule.

In an example of FIG. 5, the RS receives data and transmits ACK/NACK. However, the present invention is not limited thereto, and thus the BS and the MS can also receive data and transmit ACK/NACK. In the following case described below, the station which cannot transmit synchronous ACK/NACK after receiving data may be the BS, RS or MS.

FIG. 6 to FIG. 9 are flowcharts showing examples in which synchronous ACK/NACK cannot be transmitted using the blank subframe method.

Figure 6:
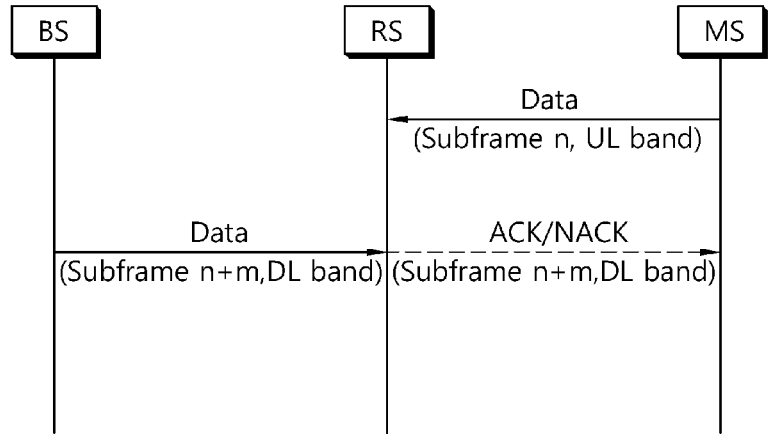
FIG. 6 to FIG. 9 are flowcharts showing examples in which synchronous ACK/NACK cannot be transmitted using a blank subframe method.

Referring to FIG. 6, an RS receives data from an MS through a UL frequency band in a subframe n. According to the synchronous ACK/NACK transmission rule, the RS transmits ACK/NACK to the MS through a DL frequency band in a subframe n+m, which is a specific time after the subframe n. However, if there is data that must be received by the RS from the BS through the DL frequency band in the subframe n+m, the synchronous ACK/NACK cannot be transmitted.

Figure 7:
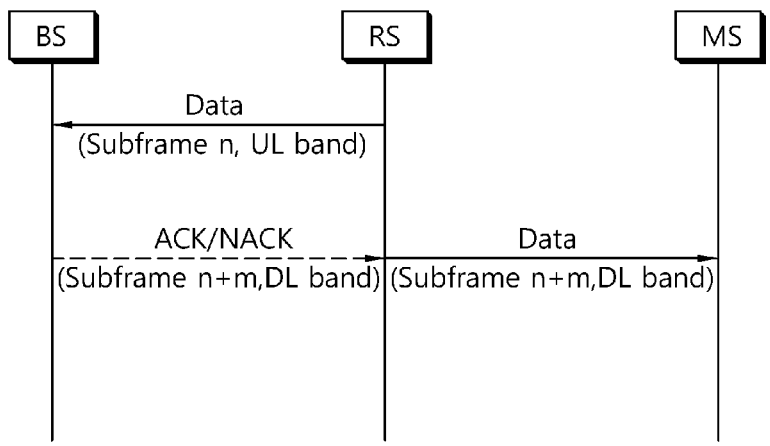

Referring to FIG. 7, a BS receives data from an RS through a UL frequency band in a subframe n. According to the synchronous ACK/NACK transmission rule, the BS transmits ACK/NACK to the RS through a DL frequency band in a subframe n+m, which is a specific time after the subframe n. However, if there is data that must be transmitted by the RS to an MS through the DL frequency band in the subframe n+m, the BS cannot transmit the synchronous ACK/NACK to the RS.

Figure 8:
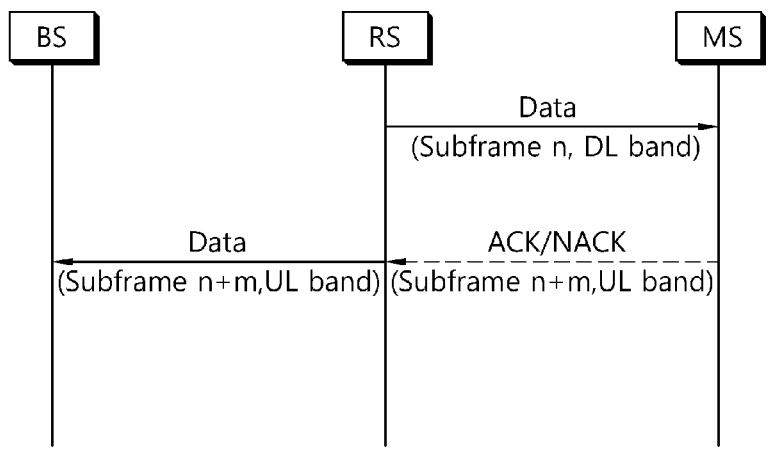

Referring to FIG. 8, an MS receives data from an RS through a DL frequency band in a subframe n. According to the synchronous ACK/NACK transmission rule, the MS transmits ACK/NACK to the RS through a UL frequency band in a subframe n+m, which is a specific time after the subframe n. However, if there is data that must be transmitted by the RS to a BS through the UL frequency band in the subframe n+m, the MS cannot transmit the synchronous ACK/NACK to the RS.

Figure 9:
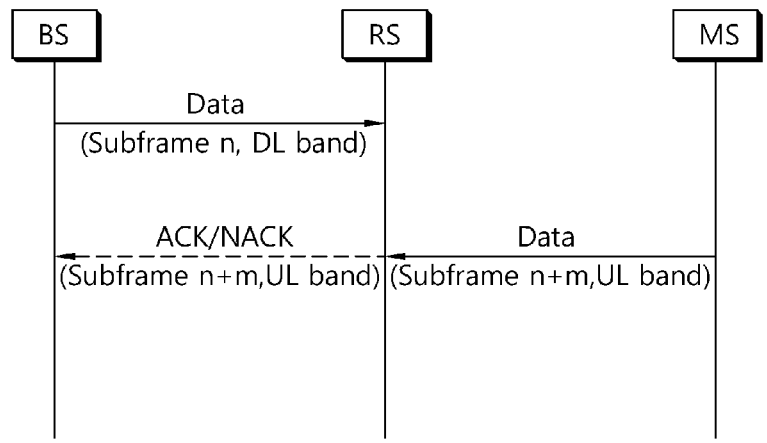

Referring to FIG. 9, an RS receives data from a BS through a DL frequency band in a subframe n. According to the synchronous ACK/NACK transmission rule, the RS transmits ACK/NACK to the BS through a UL frequency band in a subframe n+m, which is a specific time after the subframe n. However, if there is data that must be transmitted by an MS to the RS through the UL frequency band in the subframe n+m, the RS cannot transmit the synchronous ACK/NACK to the BS.

Figure 10:
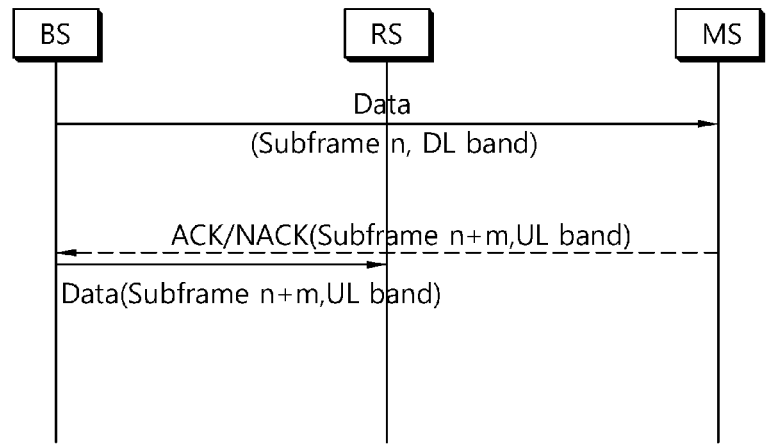
FIG. 10 is a flowchart showing an example in which synchronous ACK/NACK cannot be transmitted using a band swapping method.

FIG. 10 is a flowchart showing an example in which synchronous ACK/NACK cannot be transmitted using the band swapping method.

Referring to FIG. 10, an MS receives data from a BS through a DL frequency band in a subframe n. According to the synchronous ACK/NACK transmission rule, the MS transmits ACK/NACK to the BS through a UL frequency band in a subframe n+m, which is a specific time after the subframe n. However, if there is data that must be transmitted by the BS to an RS through the UL frequency band in the subframe n+m, the MS cannot transmit the synchronous ACK/NACK to the BS.

As described with reference to FIG. 6 to FIG. 10, if synchronous ACK/NACK cannot be transmitted for received data, the ACK/NACK has to be transmitted using another method. Hereinafter, a specific rule to be used in replacement of the synchronous ACK/NACK transmission rule will be described.

<Method in which ACK/NACK is Transmitted with Additional Time Delay>

1) Blank Subframe Method

According to the blank subframe method, an RS transmits data to a BS through a UL frequency band in a subframe n, and sets a subframe n+m of a DL frequency band to a blank subframe in order to receive ACK/NACK for the data from the BS. If there is data that must be transmitted by the RS to MSs through the DL frequency band in the subframe n+m, a problem arises in that the RS cannot receive ACK/NACK for data transmitted to the BS through the UL frequency band in the subframe n. An example of the data that must be transmitted by the RS to the MSs through the DL frequency band in a specific subframe is a synchronous signal for initial access of the MSs.

To solve this problem, the RS may transmit data using ACK/NACK with an additional time delay through the UL frequency band in the subframe n. The BS may transmit ACK/NACK for data received from the RS through the UL frequency band in the subframe n after an additional time delay elapses.

Figure 11:
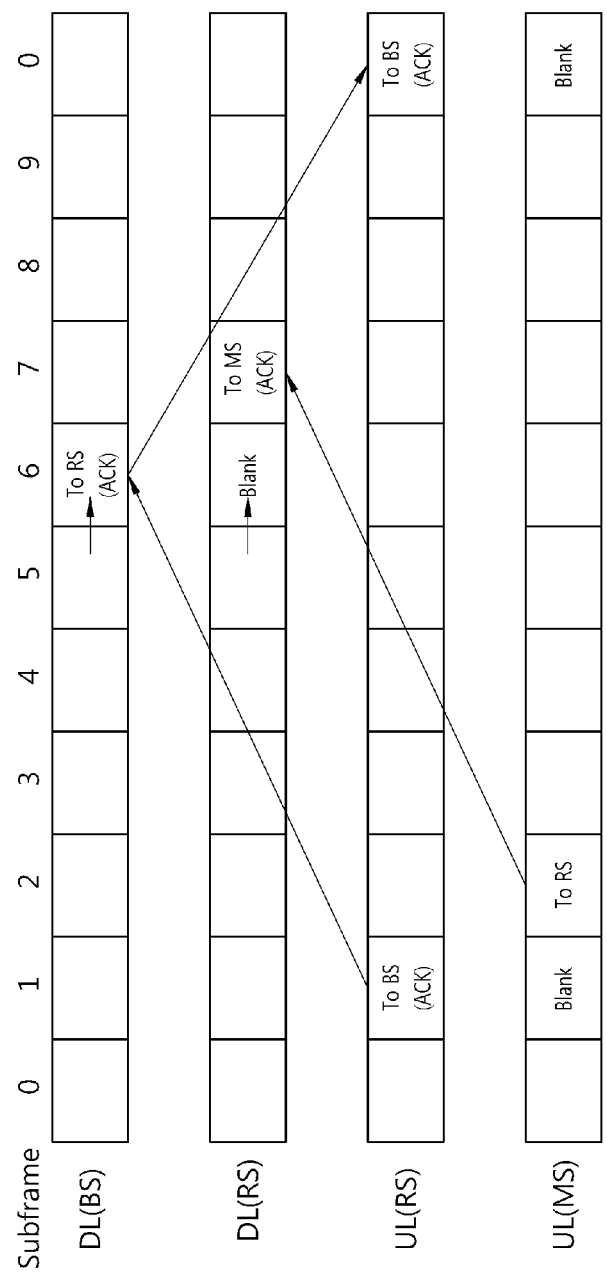
FIG. 11 shows a method for transmitting data and ACK/NACK according to an embodiment of the present invention.

FIG. 11 shows a method for transmitting data and ACK/NACK according to an embodiment of the present invention. It is assumed herein that m=4.

Referring to FIG. 11, an RS transmits data to a BS through a UL frequency band in a subframe 1. If ACK/NACK for the data is allowed to have an additional time delay, the BS can transmit the ACK/NACK to the RS through a DL frequency band at a time added with a specific time delay. For example, the additional time delay may be one subframe. Therefore, the BS can transmit ACK/NACK for data transmission in the subframe 1 of the RS through a DL subframe in a subframe 6 with an additional time delay corresponding to one subframe from a subframe 5. Occasionally, the additional time delay may be expressed by a value less than 0. In this case, ACK/NACK is transmitted prior to a time of transmitting synchronous ACK/NACK. Accordingly, the RS may set the subframe 6 to a blank subframe, and may perform downlink transmission including a signal that must be transmitted to an MS through the DL frequency band in the subframe 5. If the MS transmits data to the RS through the UL frequency band in a subframe 2, ACK/NACK for the data may have an additional time delay corresponding to one subframe. Accordingly, the RS can transmit ACK/NACK to the MS through the DL frequency band in a subframe 7.

For this, through a higher layer or a control channel, the BS can notify to the RS that ACK/NACK for data transmitted through the UL frequency band in the subframe 1 will be transmitted with an additional time delay. Alternatively, in form of a control signal generated by the higher layer or by the control channel or in form of a flag in a header of Tx data, the RS may request to the BS to transmit ACK/NACK for data transmitted through the UL frequency band in the subframe 1 with an additional time delay. Accordingly, the RS does not wait for ACK/NACK from the BS in the subframe 5, and thus RS can transmit DL data to the MS without setting the subframe 5 of the DL frequency band to a blank subframe. Likewise, through the higher layer or the control channel, the RS can announce to MSs that ACK/NACK for data transmitted from the MSs through the UL frequency band in the subframe 2 will be transmitted with an additional time delay.

Meanwhile, when the BS transmits data to the RS through the DL frequency band in the subframe n, the RS transmits ACK/NACK to the BS through the UL frequency band in the subframe n+m. If there is a signal that must be received by the RS from the MS through the UL frequency band in the subframe n+m, a problem arises in that the RS cannot transmit ACK/NACK to the BS through the UL frequency band in the subframe n+m. Examples of the signal that must be received by the RS from the MS through the UL frequency band in a specific subframe include uplink ACK/NACK, uplink sounding reference signal, etc. In this case, if ACK/NACK for the data received from the BS through the DL frequency band in the subframe n is allowed to have an additional time delay, the RS can receive a signal from the MS through the UL frequency band in the subframe n+m, and can transmit the ACK/NACK to the BS through the UL frequency band in a subsequent subframe. Alternatively, if there is a signal that must be transmitted by the RS to the BS through the UL frequency band in the subframe n+m, the MS may use an additional time delay for the ACK/NACK to transmit the ACK/NACK to the RS through the UL frequency band after the subframe n+m, and the RS may transmit the signal to the BS through the UL frequency band in the subframe n+m.

2) Band Swapping Method

According to the band swapping method, when a BS transmits data to an RS through a UL frequency band in a subframe n, there is a problem in that ACK/NACK for data transmitted to an MS through a DL frequency band in a subframe n−m cannot be received. In this case, ACK/NACK can be allowed to have an additional time delay for the data transmitted to the MS in the subframe n−m.

Figure 12:
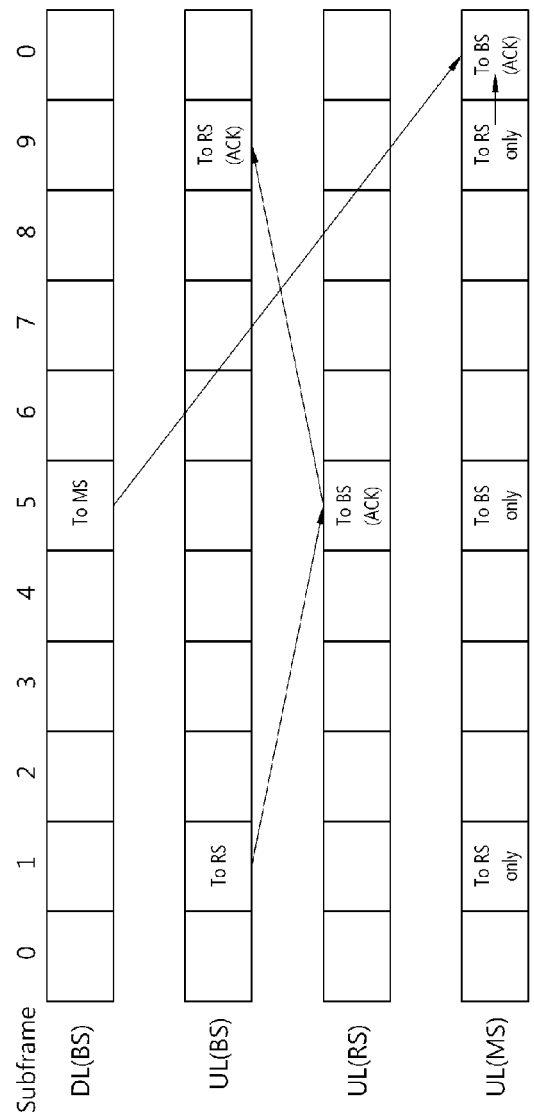
FIG. 12 shows a method for transmitting data and ACK/NACK according to another embodiment of the present invention.

FIG. 12 shows a method for transmitting data and ACK/NACK according to another embodiment of the present invention. It is assumed herein that m=4.

Referring to FIG. 12, a BS transmits data to an MS through a DL frequency band in a subframe 5, and the MS transmits ACK/NACK for the data after having one subframe of an additional time delay. Therefore, the MS can transmit ACK/NACK to the BS through a UL frequency band in a subframe 0 of a frame 2 rather than a subframe 9 of a frame 1.

In this case, through a higher layer or a control channel, the BS can instruct the MS to transmit ACK/NACK for data transmitted in the subframe 5 with an additional time delay. Accordingly, the BS can transmit a signal to an RS through the UL frequency band without having to wait for ACK/NACK from MSs in the subframe 9.

<Method in Which ACK/NACK is Transmitted After Receiving ACK/NACK Request Message>

1) Blank Subframe Method

Figure 13:
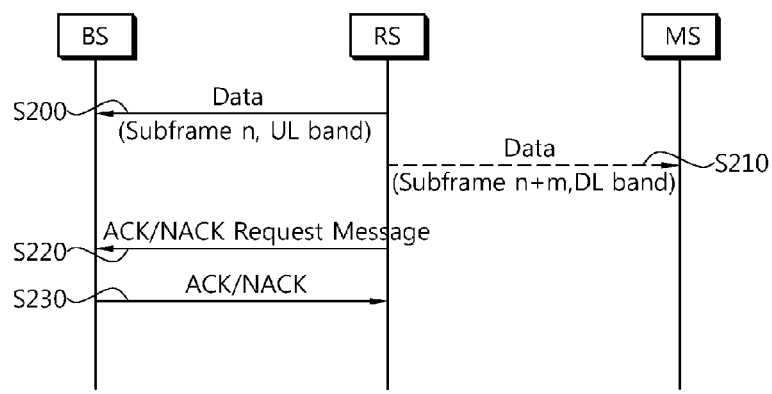
FIG. 13 is a flowchart showing a method for transmitting data and ACK/NACK according to another embodiment of the present invention.

FIG. 13 is a flowchart showing a method for transmitting data and ACK/NACK according to another embodiment of the present invention.

Referring to FIG. 13, an RS transmits data to a BS through a UL frequency band in a subframe n (step S200). According to the synchronous ACK/NACK method, the BS has to transmit ACK/NACK to the RS through a DL frequency band in a subframe n+m. However, if there is data that must be transmitted by the RS to an MS through the DL frequency band in the subframe n+m (step S210), the RS transmits to the BS a message for requesting ACK/NACK for the data transmitted in step S200 in a subsequent subframe (step S220). If the RS can receive ACK/NACK from the BS through the DL frequency band in a situation where there is no signal to be transmitted to the MS through the DL frequency band, the RS can transmit an ACK/NACK request message. In response to the ACK/NACK request message, the BS transmits ACK/NACK to the RS through the DL frequency band (step S230).

Herein, through a higher layer or a control channel, the BS may announce to the RS that ACK/NACK for data transmitted by the RS through the UL frequency band in the subframe n will be transmitted only when the ACK/NACK request message is received. Alternatively, by using the higher layer or the control channel or by using a flag in a header of Tx data, the RS may request the BS to transmit the ACK/NACK for the data transmitted by the RS through the UL frequency band in the subframe n only when the ACK/NACK request message is received.

Accordingly, the RS can transmit DL data to the MS through the DL frequency band in the subframe n+m without having to set the subframe n+m of the DL frequency band to a blank subframe.

Meanwhile, if the BS transmits data to the RS through the DL frequency band in the subframe n, the RS can set the subframe n+m of the UL frequency band to a blank subframe in order to transmit ACK/NACK for the data. If there is a signal that must be received by the RS from the MS through the UL frequency band in the subframe n+m, a problem arises in that the RS cannot transmit ACK/NACK to the BS through the UL frequency band in the subframe n+m. In this case, the aforementioned problem can be solved when the RS preferentially receives a signal transmitted from the MS in the subframe n+m of the UL frequency band, and thereafter receives an ACK/NACK request message from the BS in a subsequent subframe.

2) Band Swapping Method

According to the band swapping method, when a BS transmits data to an RS through a UL frequency band in a subframe n, there is a problem in that ACK/NACK for data transmitted to an MS through a DL frequency band in a subframe n−m cannot be received.

Figure 14:
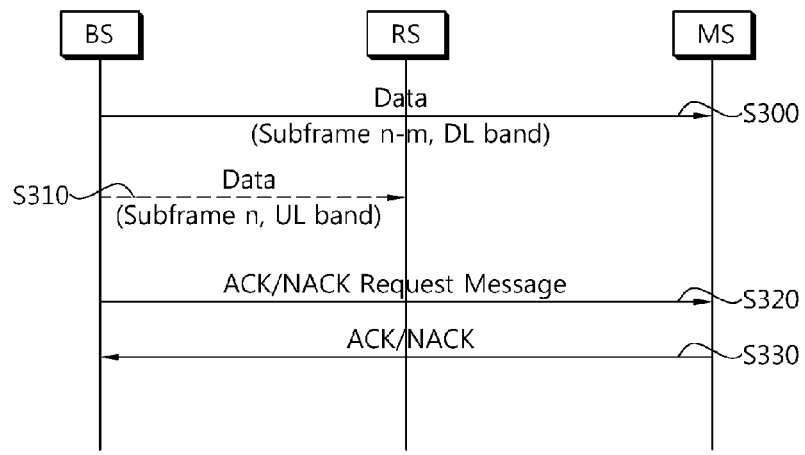
FIG. 14 is a flowchart showing a method for transmitting data and ACK/NACK according to another embodiment of the present invention.

FIG. 14 is a flowchart showing a method for transmitting data and ACK/NACK according to another embodiment of the present invention.

Referring to FIG. 14, a BS transmits data to an MS through a DL frequency band in a subframe n−m (step S300). According to the synchronous ACK/NACK method, the MS has to transmit ACK/NACK to the BS through a UL frequency band in a subframe n. However, if there is data that must be transmitted by the BS to an RS through the UL frequency band in the subframe n (step S310), the BS transmits to the MS a message for requesting ACK/NACK for the data transmitted in step S300 (step S320). If there is no signal to be transmitted to the RS through the UL frequency band and ACK/NACK can be received from the MS through the UL frequency band, the BS can transmit an ACK/NACK request message. The MS transmits ACK/NACK to the BS through the UL frequency band in response to the ACK/NACK request message (step S330).

Herein, through a higher layer or a control channel, the BS can announce to the MS that ACK/NACK for data transmitted by the BS through the DL frequency band in the subframe n−m will be transmitted only when the ACK/NACK request message is received. Accordingly, the BS can transmit data to the RS through the UL frequency band in the subframe n.

<Method in which ACK/NACK is Transmitted after being Processed by Intermediate Means>

1) Blank Subframe Method

Figure 15:
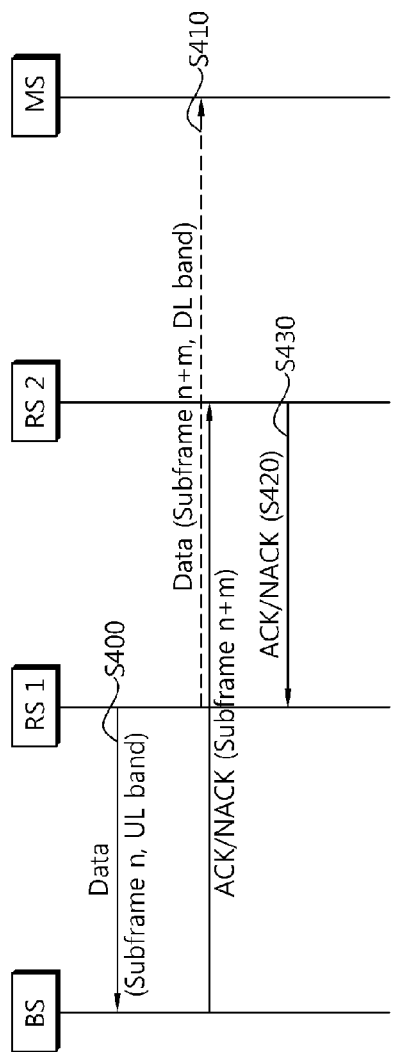
FIG. 15 is a flowchart showing a method for transmitting data and ACK/NACK according to another embodiment of the present invention.

FIG. 15 is a flowchart showing a method for transmitting data and ACK/NACK according to another embodiment of the present invention. It is assumed herein that a BS is associated with a plurality of RSs.

Referring to FIG. 15, an RS 1 transmits data to the BS through a UL frequency band in a subframe n (step S400). According to the synchronous ACK/NACK method, the BS transmits ACK/NACK to the RS 1 through a DL frequency band in a subframe n+m. However, if there is data that must be transmitted by the RS 1 to an MS through the DL frequency band in the subframe n+m (step S410), the BS transmits ACK/NACK for the data received in step S300 to an RS 2 through the DL frequency band in the subframe n+m (step S420). The RS 2 transmits the ACK/NACK received in step S420 to the RS 1 in a subsequent subframe (step S430).

Accordingly, the RS 1 can transmit DL data to the MS through the DL frequency band in the subframe n+m. In this case, by exchanging a signal with the BS, the RS 1 can know in advance that ACK/NACK for the data transmitted in step S400 will be received with an additional time delay from another RS.

2) Band Swapping Method

According to the band swapping method, when a BS transmits data to an RS through a UL frequency band in a subframe n, there is a problem in that ACK/NACK for data transmitted to an MS through a DL frequency band in a subframe n−m cannot be received.

Figure 16:
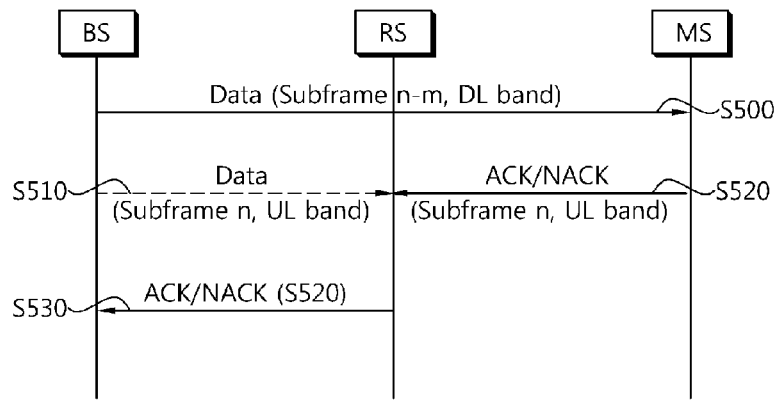
FIG. 16 is a flowchart showing a method for transmitting data and ACK/NACK according to another embodiment of the present invention.

FIG. 16 is a flowchart showing a method for transmitting data and ACK/NACK according to another embodiment of the present invention.

Referring to FIG. 16, a BS transmits data to an MS through a DL frequency band in a subframe n−m (step S500). According to the synchronous ACK/NACK method, the MS has to transmit ACK/NACK to the BS through a UL frequency band in a subframe n. However, if there is data that must be transmitted by the BS to an RS through the UL frequency band in the subframe n (step S510), the MS transmits ACK/NACK for the data received in step S500 to the RS through the UL frequency band in the subframe n (step S520). The RS transmits ACK/NACK received in step S520 to the BS in a subsequent subframe (step S530).

Accordingly, the BS can transmit data to the RS through the UL frequency band in the subframe n. In this case, the BS can know in advance that ACK/NACK for the data transmitted in step S500 will be received with an additional time delay from the RS.

In the method described above with reference to FIG. 6 to FIG. 10, ACK/NACK is transmitted according to a specific rule when synchronous ACK/NACK cannot be transmitted for received data.

In addition thereto, to solve the problem of FIG. 6 to FIG. 10, a method for transmitting data not requiring ACK/NACK can be taken into consideration.

1) Blank Subframe Method

An RS transmits first data to a BS through a UL frequency band in a subframe n. According to the synchronous ACK/NACK transmission rule, in order to receive ACK/NACK for transmission of the first data through a DL frequency band in a subframe n+m, the RS sets the subframe n+m of the DL frequency band to a blank subframe. However, if there is second data that must be transmitted by the RS to MSs through the DL frequency band in the subframe n+m, the RS may regard the first data as data not requiring ACK/NACK. An example of the data that must be transmitted by the RS to the MSs through the DL frequency band in a specific subframe is a synchronization signal for initial access of the MSs.

Figure 17:
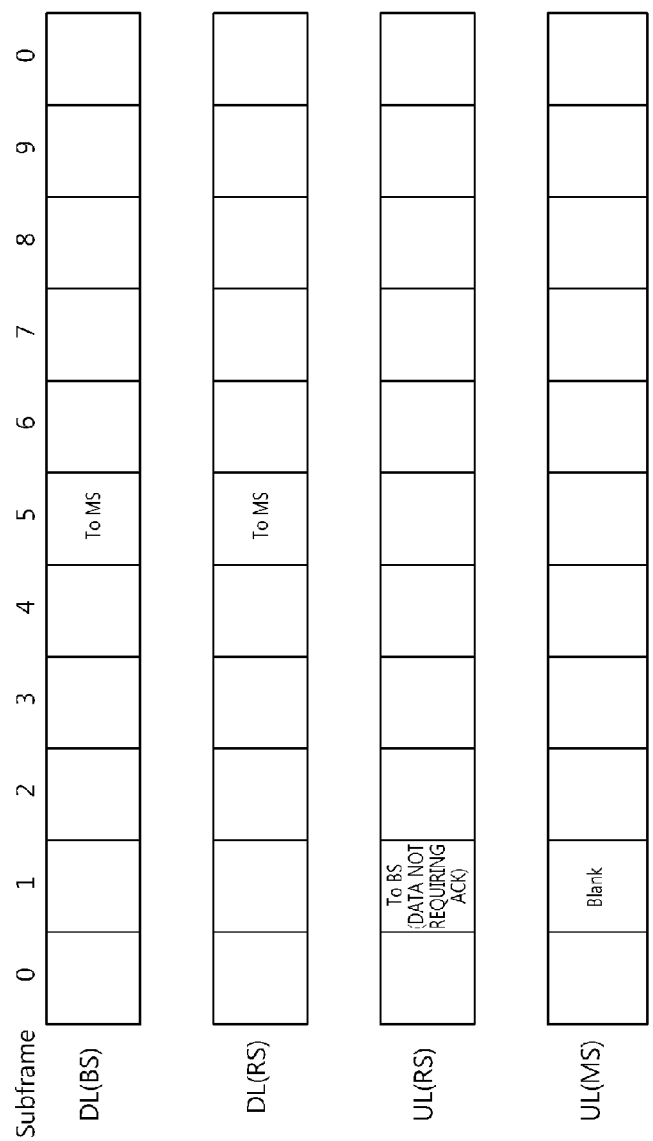
FIG. 17 shows a method for transmitting data according to an embodiment of the present invention.

FIG. 17 shows a method for transmitting data according to an embodiment of the present invention. It is assumed herein that m=4.

Referring to FIG. 17, an RS transmits data to a BS through a UL frequency band in a subframe 1. According to the synchronous ACK/NACK transmission rule, the RS has to receive ACK/NACK through a DL frequency band in a subframe 5, and thus sets the subframe 5 of the DL frequency band to a blank subframe. However, if there is data that must be transmitted by the RS to an MS through the DL frequency band in the subframe 5, the RS cannot receive the ACK/NACK.

To solve this problem, data transmitted by the RS to the BS in the subframe 1 may be in form of data not requiring ACK/NACK. In this case, through a higher layer or a control channel, the BS can announce to the RS that data not requiring ACK/NACK will be transmitted in the subframe 1. Alternatively, by using the higher layer or the control channel or by using a flag in a header of Tx data, the RS can announce to the BS that the data transmitted in the subframe 1 is data not requiring ACK/NACK. Alternatively, the RS may not transmit any data to the BS through the UL frequency band in the subframe 1. Accordingly, the RS can transmit DL data to the MS through the DL frequency band in the subframe 5 without having to wait for ACK/NACK from the BS in the subframe 5.

Meanwhile, when the BS transmits data to the RS through the DL frequency band in the subframe n, the RS sets a subframe n+m of the UL frequency band to a blank subframe in order to transmit ACK/NACK for transmission of the data through the UL frequency band. If there is a signal that must be received by the RS from the MS through the UL frequency band in the subframe n+m, the BS may transmit data not requiring ACK/NACK to the RS in a subframe n or may not transmit data. Accordingly the RS does not have to transmit ACK/NACK to the BS in the subframe n+m, and thus can receive UL data from the MS through the UL frequency band in the subframe n+m.

2) Band Swapping Method

A BS transmits first data to an MS through a DL frequency band in a subframe n−m, and transmits second data to an RS through a UL frequency band in a subframe n. According to the synchronous ACK/NACK transmission rule, the BS may receive ACK/NACK for the first data from the MS through the UL frequency band in the subframe n. However, if the second data is data that must be transmitted by the BS to the RS through the UL frequency band in the subframe n, the BS cannot receive ACK/NACK for the first data.

To solve this problem, the first data may be regarded as data not requiring ACK/WO NACK. An example of the data not requiring ACK/NACK is a multimedia broadcast multicast service (MBMS) signal. In this case, by using a higher layer or a control channel, the BS can announce to MSs that the first data is data not requiring ACK/NACK. Alternatively, the BS may not transmit any data to the MS through the DL frequency band in the subframe n−m. Accordingly, the BS can transmit data to the RS through the UL frequency band in the subframe n without any restriction.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting data in a wireless communication system employing a relay station, the method comprising:

transmitting, by the relay station, first data to a base station through an uplink (UL) frequency band in a first subframe; and transmitting, by the relay station, second data to a mobile station through a downlink (DL) frequency band in a second subframe, wherein the second subframe is a subframe delayed by a specific time from the first subframe, wherein the first data is data not requiring ACK/NACK for transmission of the first data when the transmission of the second data must be performed by the relay station through the DL frequency band in the second subframe, and wherein the second data is related with a synchronization signal for performing an initial access of the mobile station.

2. The method of claim 1, wherein the first data is a multimedia broadcast multicast service (MBMS) signal.

* * * * *